US007295785B2

(12) United States Patent
Takahashi et al.

(10) Patent No.: US 7,295,785 B2
(45) Date of Patent: Nov. 13, 2007

(54) RECEIVER, ELECTRONIC APPARATUS, AND DISCHARGE LAMP LIGHTING APPARATUS

(75) Inventors: Yuuji Takahashi, Kanagawa-ken (JP); Noriyuki Kitamura, Kanagawa-ken (JP); Katsuyuki Kobayashi, Kanagawa-ken (JP); Kazutoshi Mita, Kanagawa-ken (JP); Hirokazu Otake, Kanagawa-ken (JP); Keiichi Shimizu, Kanagawa-ken (JP)

(73) Assignee: Toshiba Lighting & Technology Corporation, Tokyo (JP)

(*) Notice: Subject to any disclaimer, the term of this patent is extended or adjusted under 35 U.S.C. 154(b) by 595 days.

(21) Appl. No.: 10/832,448

(22) Filed: Apr. 27, 2004

(65) Prior Publication Data

US 2004/0223764 A1 Nov. 11, 2004

(30) Foreign Application Priority Data

May 7, 2003 (JP) ............................ 2003-129096
Mar. 11, 2004 (JP) ............................ 2004-069502

(51) Int. Cl.
*H04B 10/06* (2006.01)

(52) U.S. Cl. ........................ 398/202; 398/45; 398/239

(58) Field of Classification Search .................. 398/45, 398/110, 239, 138, 202
See application file for complete search history.

(56) References Cited

U.S. PATENT DOCUMENTS

| | | | | |
|---|---|---|---|---|
| 4,231,094 | A * | 10/1980 | Desblache | 375/281 |
| 5,546,211 | A * | 8/1996 | Devon | 398/98 |
| 2002/0005794 | A1* | 1/2002 | Yamaguchi | 341/120 |
| 2006/0006779 | A1* | 1/2006 | Foo | 313/238 |

FOREIGN PATENT DOCUMENTS

| | | |
|---|---|---|
| JP | 6-5638 | 1/1994 |

* cited by examiner

*Primary Examiner*—Chanh D. Nguyen
*Assistant Examiner*—Shaheda Abdin
(74) *Attorney, Agent, or Firm*—Oblon, Spivak, McClelland, Maier & Neustadt, P.C.

(57) ABSTRACT

A receiver includes a light-receiving portion which receives an infrared remote control signal from a transmitter, an A/D converter which converts a signal received by the light-receiving portion into a digital signal at a frequency much higher than a carrier wave, and a digital filter having the band-pass function of a pass band containing the carrier band of the infrared remote control signal for the digital signal output from the A/D converter. The digital filter reduces the influence of variations in argon spectrum intensity over time.

7 Claims, 12 Drawing Sheets

RECEIVER, ELECTRONIC APPARATUS, AND DISCHARGE LAMP LIGHTING APPARATUS

CROSS-REFERENCE TO RELATED APPLICATIONS

This application is based upon and claims the benefit of priority from prior Japanese Patent Applications No. 2003-129006, field May 7, 2003; and No. 2004-069502, filed Mar. 11, 2004, the entire contents of both of which are incorporated herein by reference.

BACKGROUND OF THE INVENTION

1. Field of the Invention

The present invention relates to a receiver which receives an infrared remote control signal, an electronic apparatus having the receiver, and a discharge lamp lighting apparatus having a light-receiving portion which receives an infrared remote control signal.

2. Description of the Related Art

For example, in Jpn. Pat. Appln. KOKOKU Publication No. 6-5638 (pp. 3-4), a plurality of fluorescent lamps are attached to sockets on a chassis. A storage is interposed between the fluorescent lamps on the chassis, and incorporates a light-receiving portion for an infrared remote control signal. An optical filter such as a long-pass filter or band-pass filter is attached to the front end of the light-receiving portion. The filter cuts out most of the argon spectra generated in the initial lighting stage of the fluorescent lamps, and only an infrared remote control signal reaches the light-receiving portion.

The structure with the optical filter attached to a desired function and most of the argon spectra can be cut out when light is incident perpendicularly or almost perpendicularly on the plane of the optical filter. When light is obliquely incident, for example, the peak wavelength shifts toward the short-wavelength direction, failing to obtain a desired function.

FIG. 1A shows the change of a lamp current S1 over time in the initial lighting stage of the fluorescent lamp. FIG. 1B shows the change of a relative argon emission intensity S2. The relative argon emission intensity was obtained by lighting a fluorescent lamp FHC34 (available from TOSHIBA LIGHTING & TECHNOLOGY) at −2° C., and observing an argon emission state upon lighting the lamp by using a photomultiplier tube whose front end was covered with a monochrome optical filter for transmitting an 851-nm ray serving as one of the argon lines.

The waveforms in FIGS. 1A and 1B reveal that variations in the argon spectrum intensity over time synchronize with the lamp lighting cycle. When the lighting frequency is about 50 kHz, the intensity of the argon spectrum in the infrared range also varies at about 50 kHz.

For this reason, if the argon spectrum on a wavelength side lightly shorter than the wavelength of an infrared remote control signal obliquely enters the light-receiving portion via the optical filter and passes through the light-receiving portion, variations in argon spectrum intensity over time may be erroneously determined as a signal from a remote control system, resulting in a malfunction.

The present invention provides a receiver, electronic apparatus, and discharge lamp lighting apparatus which can reduce the influence of variations in argon spectrum intensity over time and reliably extract an infrared remote control signal.

BRIEF SUMMARY OF THE INVENTION

According to the first aspect of the present invention, a receiver to be used in an environment illuminated by a discharge lamp comprises a light-receiving portion which receives an infrared remote control signal transmitted using a carrier wave, an A/D converter which converts the signal received by the light-receiving portion into a digital signal by sampling at a frequency much higher than the carrier wave frequency of the infrared remote control signal, and a digital filter having a function of receiving the digital signal output from the A/D converter and of transmitting a carrier frequency component.

In this manner, a signal received by the light-receiving portion is sampled and converted into a digital signal at a frequency much higher than the carrier frequency of the infrared remote control carrier frequency component. Even if the argon spectrum whose intensity varies in synchronism with the lighting period of the discharge lamp exists at the periphery in the use of the receiver in an environment illuminated by the discharge lamp, the influence of variations in argon spectrum intensity over time on the received signal can be reduced.

According to the second aspect of the present invention, a receiver to be used in an environment illuminated by a discharge lamp further comprises a Hilbert transformer which Hilbert-transforms an output signal of the digital filter, and a peak detector which detects a peak by squaring Hilbert-transformed signal and the output signal of the digital filter respectively, and calculating a square root of sum of the each squared numbers. Accordingly, the peak of a signal from the digital filter can be detected, more reliably extracting an infrared remote control signal.

According to the third aspect of the present invention, a receiver to be used in an environment illuminated by a discharge lamp comprises a light-receiving portion which receives an infrared remote control signal transmitted using a carrier wave, an A/D converter which converts a signal received by the light-receiving portion into a digital signal by sampling at a frequency fs much higher than the carrier wave frequency fc of the infrared remote control signal, and a digital filter having a function of receiving the digital signal output of the A/D converter, and of transmitting a frequency component within a range of $fc \pm 1/(2 \cdot T1)$, when one module time is T1 in creating a data format of the infrared remote control signal.

That is, when the amplitude of the carrier frequency fc is modulated using transmission data, the infrared remote control signal contains frequency components such as $fc \pm 1/(2 \cdot T1)$ and $fc \pm 1/(4 \cdot T1)$ in addition to the component of the carrier frequency fc. To extract the signal component of transmission data from an infrared remote control signal, frequency components such as $fc \pm 1/(2 \cdot T1)$ and $fc \pm 1/(4 \cdot T1)$ are required in addition to the carrier frequency fc. To extract these frequency components, the frequency must be transmitted in the range $fc \pm 1/(2 \cdot T1)$.

According to the fourth aspect of the present invention, in the receiver of the third aspect of the present invention, the A/D converter sets the sampling frequency fs to $fs > 2 \cdot fstopH$, when an upper cutoff frequency of the digital filter is set to fstopH {note that $fstopH > fc + 1/(2 \cdot T1)$}. In order to extract the signal component of transmission data from an infrared remote control signal, the frequency must be transmitted in the range $fc \pm 1/(2 \cdot T1)$. To ensure passage, a cutoff frequency at which the frequency level is greatly attenuated must be set outside the pass band. The setting of the cutoff frequency is variously determined depending on conditions for attenuating the level. In order to reliably guarantee the cutoff frequency, the sampling frequency fs must be set twice or more the upper cutoff frequency fstopH.

According to the fifth aspect of the present invention, an electronic apparatus to be used in an environment illuminated by a discharge lamp comprises a receiver according to the third aspect of the present invention, and an electronic apparatus main body which is operated by an infrared remote control signal received by the receiver.

According to the sixth aspect of the present invention, in the apparatus of the fifth aspect of the present invention, the apparatus further comprises a transmitter which transmits the infrared remote control signal to the receiver.

According to the seventh aspect of the present invention, a discharge lamp lighting apparatus comprises a light-receiving portion which receives an infrared remote control signal transmitted using a carrier wave, an A/D converter which converts the signal received by the light-receiving portion into a digital signal by sampling at a frequency fs much higher than the carrier wave frequency fc of the infrared remote control signal, a digital filter having a function of receiving the digital signal output from the A/D converter and of transmitting a component of a carrier frequency fc, signal processing means for shaping a waveform of a signal output from the digital filter, and a lighting control circuit which controls a discharge lamp having a tube diameter of not more than 25.5 mm in accordance with data from the signal processing means, on the condition that a minimum value of a discharge lamp lighting frequency is higher than an upper cutoff frequency of the digital filter.

According to the eighth aspect of the present invention, a discharge lamp lighting apparatus comprises a light-receiving portion which receives an infrared remote control signal transmitted using a carrier wave, an A/D converter which converts the signal received by the light-receiving portion into a digital signal by sampling at a frequency fs much higher than the carrier wave frequency fc of the infrared remote control signal, a digital filter having a function of receiving the digital signal output from the A/D converter and of transmitting a component of a carrier frequency fc, signal processing means for shaping a waveform of a signal output from the digital filter, and a lighting control circuit which controls a discharge lamp having a tube diameter of not more than 25.5 mm in accordance with data from the signal processing means, on the condition that a discharge lamp lighting frequency is lower than a lower cutoff frequency of the digital filter and higher than 20 kHz.

According to the ninth aspect of the present invention, in the discharge lamp lighting apparatus of the seventh aspect of the present invention, the digital filter sets a pass band within a range of $fc\pm1/(2\cdot T1)$, when one module time is T1 in creating a data format of the infrared remote control signal.

According to the 10th aspect of the present invention, in the apparatus of the seventh aspect of the present invention, wherein the digital filter has a function of receiving the digital signal output of the A/D converter, and transmits a frequency component within a range of $fc-1/(2\cdot T1)$ to fc, when one module time is T1 in creating a data format of the infrared remote control signal.

In order to extract the signal component of transmission data from an infrared remote control signal, frequency components such as $fc\pm1/(2\cdot T1)$ and $fc\pm1/(4\cdot T1)$ are necessary together with the carrier frequency fc. To extract these frequency components, the frequency must be transmitted in the range $fc\pm1/(2\cdot T1)$. Since necessary frequency components are symmetrical about the carrier frequency fc in opposite directions, a frequency component on one side can be extracted to reproduce a frequency component on the other side. The frequency is therefore, transmitted in a lower half range of $fc-1/(2\cdot T1)$ to fc.

According to the 11th aspect of the present invention, in the discharge lamp lighting apparatus of the 10th aspect of the present invention, the A/D converter sets the sampling frequency fs to $fs>2\cdot fstopH$, when an upper cutoff frequency of the digital filter is set to fstopH {note that $fstopH>fc$}.

According to the 12th aspect of the present invention, in the apparatus of the seventh aspect of the present invention, wherein the digital filter has a function of receiving the digital signal output from the A/D converter, and of transmitting a frequency component within a range of fc to $fc+1/(2\cdot T1)$, when one module time is T1 in creating a data format of the infrared remote control signal.

To extract the signal component of transmission data from an infrared remote control signal, frequency components such as $fc\pm1/(2\cdot T1)$ and $fc\pm1/(4\cdot T1)$ are needed together with the carrier frequency fc. To extract these frequency components, the frequency must be transmitted in the range $fc\pm1/(2\cdot T1)$ Since necessary frequency components are symmetrical about the carrier frequency fc in opposite directions, a frequency component on one side can be extracted to reproduce a frequency component on the other side. Hence, the frequency is transmitted in an upper half range of fc to $fc+1/(2\cdot T1)$ According to the 13th aspect of the present invention, in the discharge lamp lighting apparatus of the 12th aspect of the present invention, the A/D converter sets the sampling frequency fs to $fs>2\cdot fstopH$, when an upper cutoff frequency of the digital filter is set to fstopH {note that $fstopH>fc+1(2\cdot T1)$ }.

Additional objects and advantages of the invention will be set forth in the description which follows, and in part will be obvious from the description, or may be learned by practice of the invention. The objects and advantages of the invention may be realized and obtained by means of the instrumetalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

Preferred embodiments of the present invention will be described below with reference to the several views of the accompanying drawing. In the following embodiments, the present invention is applied to an illumination apparatus.

FIRST EMBODIMENT

Figure 1A:
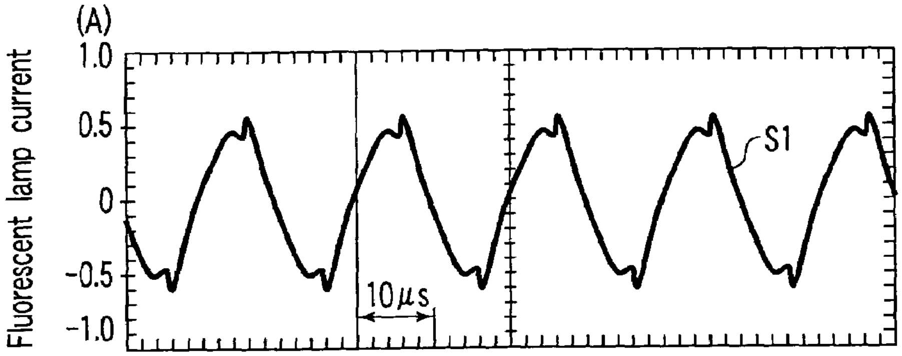
FIG. 1A is a waveform chart showing a lamp current waveform in the initial lighting state of a fluorescent lamp.
Figure 1B:
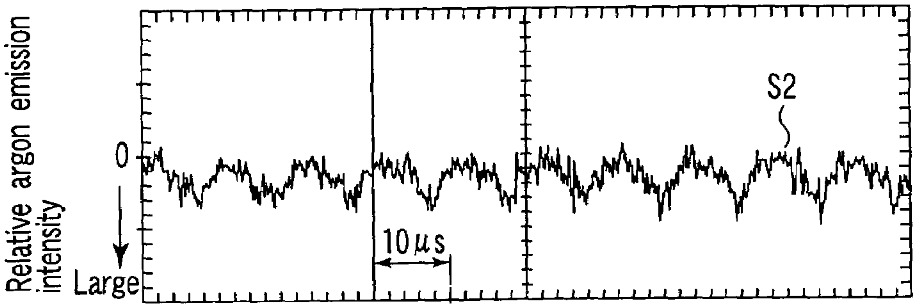
FIG. 1B is a waveform chart showing an argon spectrum intensity waveform in the initial lighting state of the fluorescent lamp.
Figure 2:
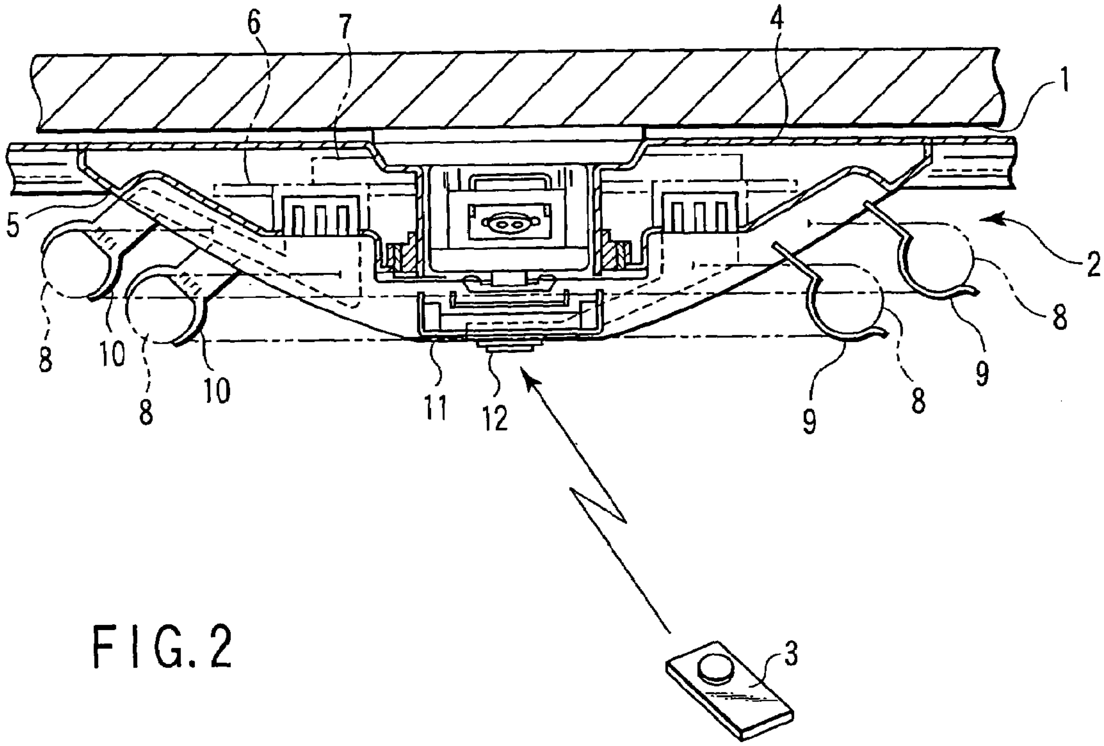
FIG. 2 is a view showing a system configuration according to the first embodiment of the present invention.

FIG. 2 is a view showing a system configuration. The system comprises an illumination apparatus 2 attached to a fixture attaching surface 1 such as a ceiling, and a transmitter 3 which transmits an infrared remote control signal to the illumination apparatus 2.

In the illumination apparatus 2, an almost conical reflector 5 is attached to the lower surface of a disk-like fixture main body 4. The fixture main body 4 covered with the reflector 5 incorporates a discharge lamp lighting apparatus 7 mounted on a board 6. The reflector 5 comprises a lamp holder 9 which holds a circular fluorescent lamp 8 serving as a discharge lamp, and a lamp socket 10 which connects the circular fluorescent lamp 8 to the discharge lamp lighting apparatus 7.

A light-receiving portion 12 with a light-receiving surface facing down is attached to a base 11 formed at the center of the reflector 5. The light-receiving portion 12 receives an infrared remote control signal from the transmitter 3. The infrared remote control signal is transmitted together with a signal component which is superposed on a carrier wave of several ten kHz and controls ON/OFF operation, dimming, and the like.

Figure 3:
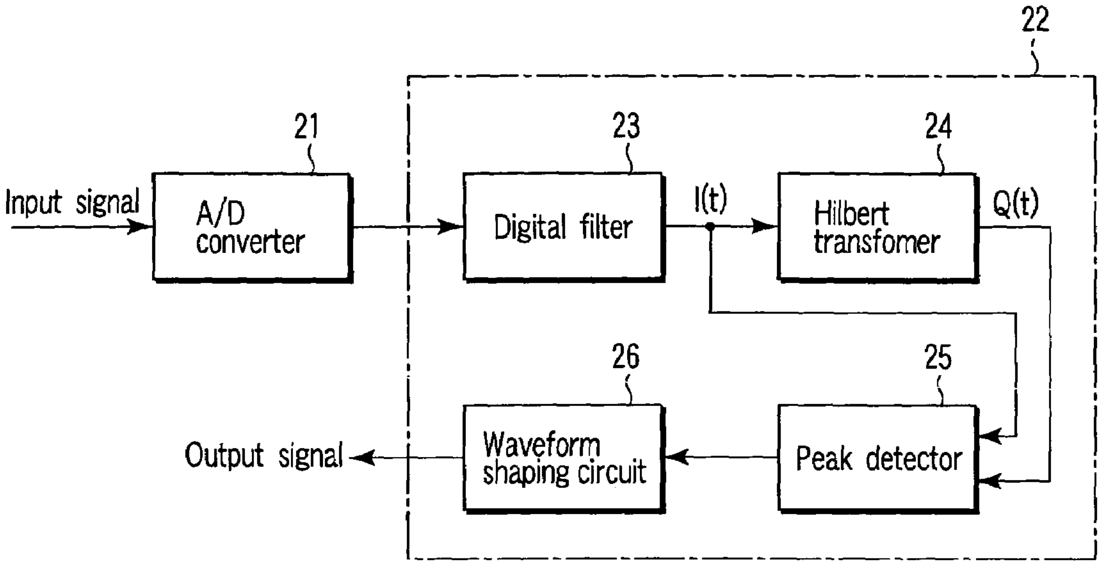
FIG. 3 is a block diagram showing the main arrangement of a receiver in an illumination apparatus according to the first embodiment.

A receiver having the light-receiving portion 12 processes a signal received by the light-receiving portion 12, and this process is executed by a circuit block shown in FIG. 3. More specifically, an analog signal output from the light-receiving portion 12 is input as an input signal into an A/D converter 21. The A/D converter 21 converts the input signal into a digital signal, and supplies the digital signal to a signal processor 22.

The signal processor 22 is comprised of a digital filter 23 which performs a digital process for a signal and has a band-pass function, a Hilbert transformer 24 which Hilbert-transforms a signal from the digital filter 23, a peak detector 25 which squares a signal from the Hilbert transformer 24 and a signal from the digital filter 23 and calculates the square root of the sum of the squares to detect a peak, and a waveform shaping circuit 26 which shapes the waveform of a peak detection signal from the peak detector 25 and outputs the resultant signal to a subsequent circuit.

The digital filter 23 has a pass band including the carrier band of an infrared remote control signal, and realizes a filter function by a digital signal process. In the digital signal process, a signal is digitized during sampling. A filter effect can be obtained for a component lower than ½ of the sampling frequency on the basis of the sampling theorem. For example, when the carrier frequency of the infrared remote control signal is 33 kHz, a sampling frequency of 66 kHz or more must be set to extract the frequency component. This applies to a sine wave.

The sampling theorem guarantees that a signal can be completely reconstructed at a sampling frequency which is twice or more the maximum frequency contained in the signal. When the carrier waveform is rectangular, the carrier wave contains many harmonic components and requires sampling at a frequency much higher than 66 kHz. If the receiver suffices to only detect the presence/absence of a 33-kHz component and 3rd harmonic component, the sampling frequency is set to 200 kHz so as to reliably detect the fundamental frequency of 33 kHz and the 3rd harmonic component of 99 kHz. For this reason, the A/D converter 21 converts an analog signal into a digital signal at a frequency much higher than the carrier frequency.

Figure 4:
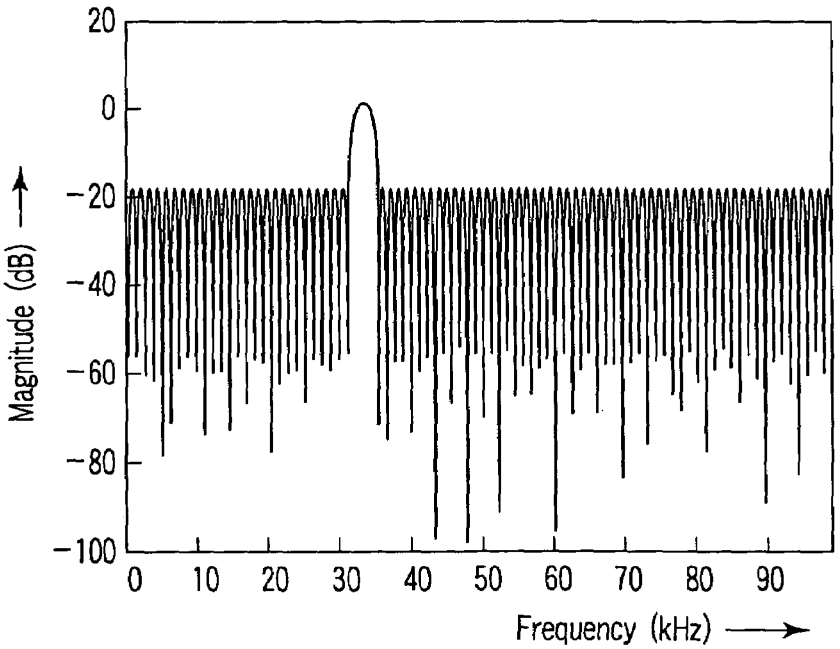
FIG. 4 is a graph showing the function of a digital filter used in the first embodiment.

FIG. 4 is a graph showing a filter character when a band-pass FIR (Finite Impulse Response) filter is used as the digital filter 23 at a carrier frequency fc=33 kHz and a sampling frequency fs=200 kHz, the pass band of the filter is the carrier frequency fc±1 kHz, and the cutoff level is −20 dB or less. In this case, the order of the FIR filter is 173.

Using the digital filter 23 with this function, frequency components outside the range of the frequency component fc±1 kHz can be satisfactorily attenuated.

As shown in FIG. 3, a signal I(t) having passed through the digital filter 23 is supplied to the Hilbert transformer 24 formed by the FIR filter and to the peak detector 25. The Hilbert transformer 24 generates a signal with a phase delay of π/2 from an actual signal. Hilbert transformation provides a signal Q(t) with a phase delay of π/2 from the original signal I(t) without changing the amplitude.

The signal Q(t) is supplied from the Hilbert transformer 24 to the peak detector 25. The peak detector 25 squares the signal I(t) having passed through the digital filter 23 and the signal Q(t) output from the Hilbert transformer 24, and calculates the square root of the sum of the squares, thereby obtaining an original signal. More specifically, the signal Q(t) has a phase delay of π/2 from the signal I(t). Letting the signal I(t)=cost, and the signal Q(t)=sint, $\cos^2 t+\sin^2 t=1$. The square root is calculated to obtain the peak value of the signal I(t). In other words, the peak of the original signal I(t) can be detected.

A peak detection signal from the peak detector 25 is supplied to the waveform shaping circuit 26, and the waveform shaping circuit 26 shapes the waveform to output the resultant signal to a subsequent circuit.

Figure 5:
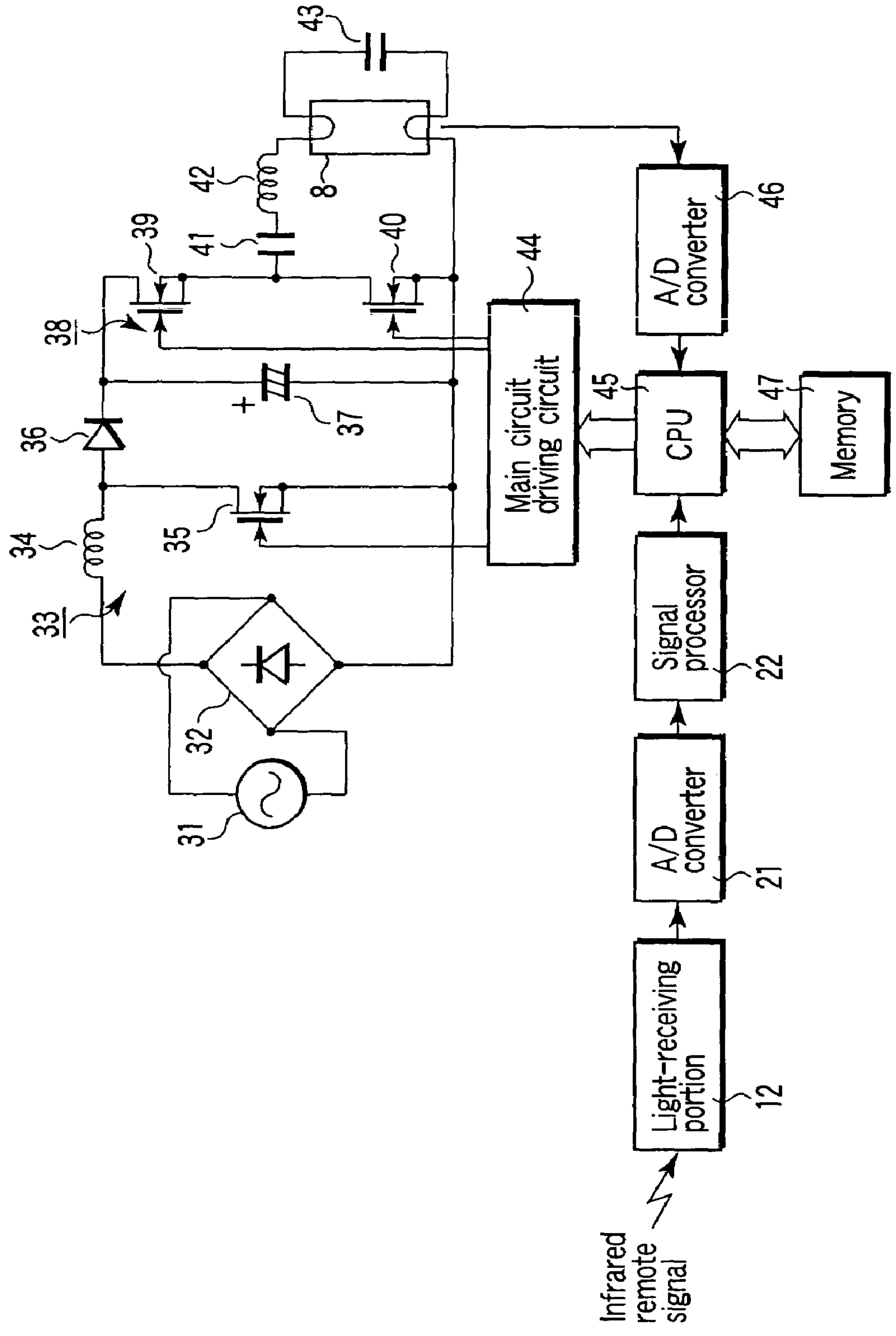
FIG. 5 is a diagram showing the circuit arrangement of a discharge lamp lighting apparatus including the receiver according to the first embodiment.

FIG. 5 is a diagram showing the circuit arrangement of the discharge lamp lighting apparatus including the receiver. An AC power supply 31 is connected to the input terminal of a full-wave rectifier 32 formed by a diode bridge circuit, and the output terminal of the full-wave rectifier 32 is connected to a step-up chopper circuit 33. In the step-up chopper circuit 33, the output terminal of the full-wave rectifier 32 is connected to a MOS FET (Field Effect Transistor) 35 via a series inductor 34. The FET 35 is parallel-connected to a smoothing capacitor 37 via a forward diode 36.

An inverter circuit 38 is connected between the two terminals of the smoothing capacitor 37. In the inverter circuit 38, a series circuit formed by a pair of MOS FETs 39 and 40 is parallel-connected to the smoothing capacitor 37. The one-terminal sides of two filaments of the circular fluorescent lamp 8 are connected to the drain-source path of the FET 40 via a series circuit of a DC-cut capacitor 41 and inductor 42. A resonant capacitor 43 is connected between the other-terminal sides of the two filaments of the circular fluorescent lamp 8. A lighting apparatus which lights a single circular fluorescent lamp 8 will be explained. The inductor 42, resonant capacitor 43, and circular fluorescent lamp 8 form a resonant circuit.

The FET 35 of the step-up chopper circuit 33 and the FETs 39 and 40 of the inverter circuit 38 are switched and driven by a main circuit driving circuit 44. The main circuit driving circuit 44 is controlled by a CPU (Central Processing Unit) 45 in accordance with a program.

A lamp current flowing through the fluorescent lamp 8 and a lamp voltage generated in the fluorescent lamp are detected. The detection signal is converted into a digital signal by an A/D converter 46, and the digital signal is supplied to the CPU 45 via a memory 47 or directly. A signal having undergone a digital process by the signal processor 22 is supplied to the CPU 45 via the memory 47 or directly.

Upon reception of the signal from the signal processor 22, the CPU 45 performs dimming control or full lighting control so as to adjust, e.g., a current flowing through the fluorescent lamp 8 to a predetermined value by referring to a signal from the A/D converter 46 and data stored in the memory 47.

In this arrangement, the transmitter 3 is manipulated toward the light-receiving portion 12 of the illumination apparatus 2 to transmit an infrared remote control signal in which an ON signal, OFF signal, or dimming signal is superposed on a 33-kHz carrier wave. The illumination apparatus 2 receives the infrared remote control signal at the light-receiving portion 12. At this time, the light-receiving portion 12 also simultaneously receives light such as the argon spectrum other than the infrared remote control signal.

The light-receiving portion 12 converts the received light content into an electrical signal. The electrical signal is converted into a digital signal by the A/D converter 21 to supply the digital signal to the digital filter 23. The digital filter 23 has a function shown in FIG. 4, and transmits a 33-kHz carrier wave. Hence, even if the light-receiving portion 12 receives light such as the argon spectrum, light is greatly attenuated by the digital filter 23. Only the carrier signal can be transmitted via the The carrier signal having passed through the digital filter 23 is input as a signal I(t) to the Hilbert transformer 24, and the Hilbert transformer 24 outputs a signal Q(t) with a phase delay of π/2. The signal I(t) is also input to the peak detector 25. The peak detector 25 detects the peak. The waveform shaping circuit 26 shapes the waveform to extract the resultant signal as an output signal.

Figure 6:
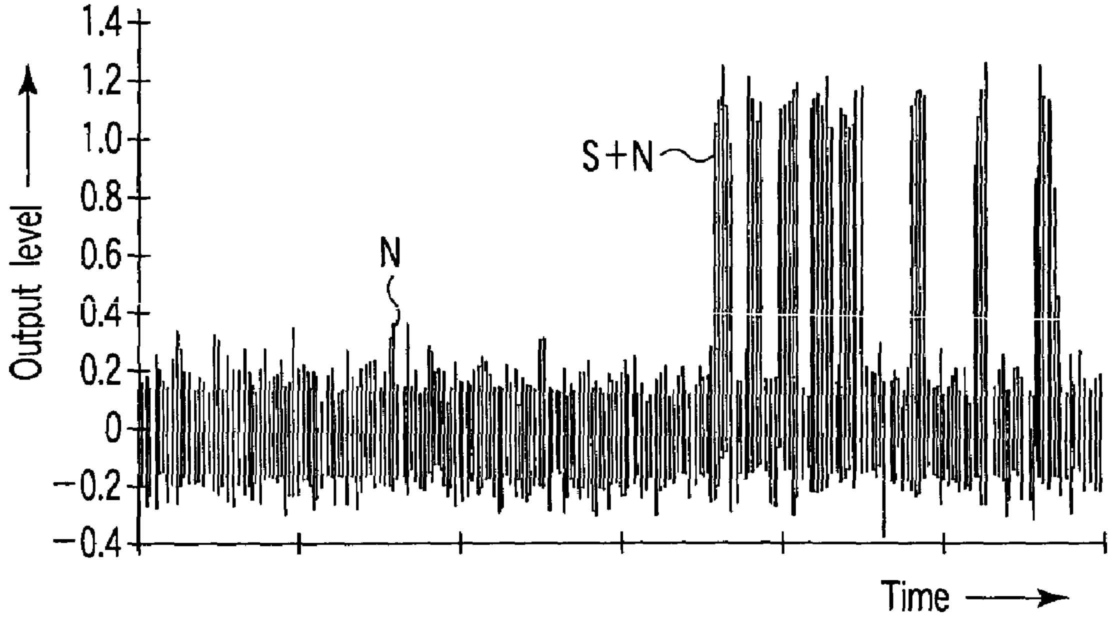
FIG. 6 is a waveform chart showing a signal received by a light-receiving portion in the illumination apparatus of the first embodiment.

For example, one module time T1 in the transmission data format of an infrared remote control signal is 0.5 ms, data "0" is set to high-level period T1+low-level period T1, data "1" is set to high-level period T1+low-level period 3×T1, and data "0000" and subsequently data "1111" are transmitted on an infrared remote control signal from the transmitter 3. A signal input to the A/D converter 21 from the light-receiving portion 12 which has received the infrared remote control signal exhibits a waveform as shown in FIG. 6.

Figure 7:
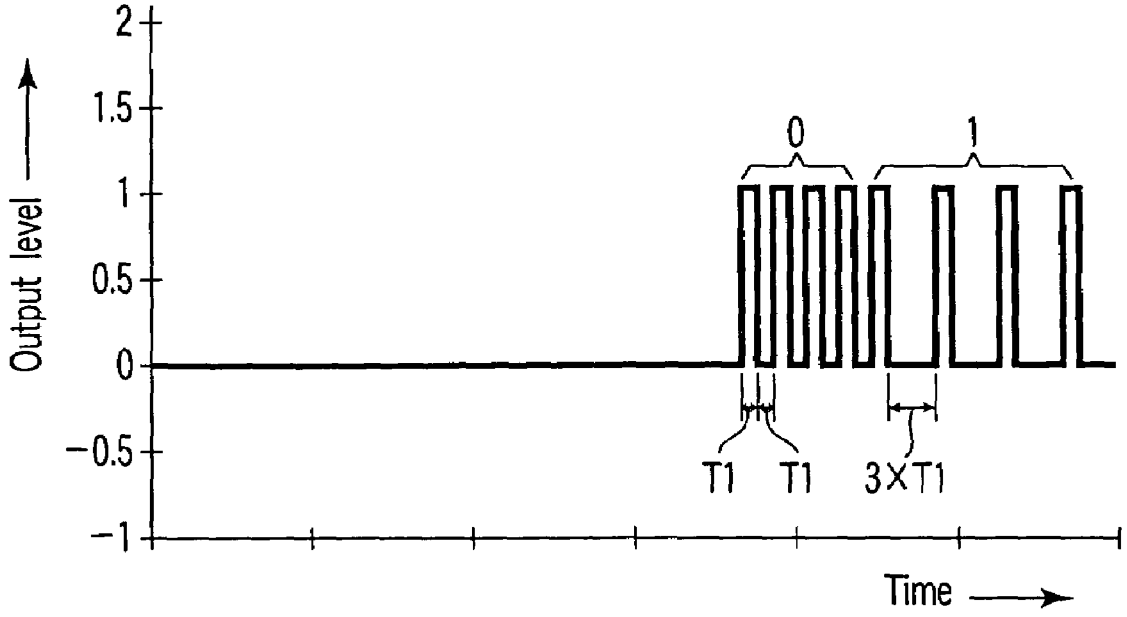
FIG. 7 is a waveform chart showing a signal output from the receiver in the illumination apparatus of the first embodiment.

More specifically, this waveform contains a signal component S and noise N. After the input signal is converted into a digital signal by the A/D converter 21, the signal sequentially passes through the digital filter 23, Hilbert transformer 24, peak detector 25, and waveform shaping circuit 26, thereby extracting only a signal component superposed on the infrared remote control signal, as shown in FIG. 7. In other words, data "0000" of four repetitive data "0" having the high-level period T1 and low-level period T1 and data "1111" of four repetitive data "1" having the high-level period T1 and low-level period 3×T1 are extracted.

From this, a signal which turns on or off the discharge lamp lighting apparatus 7 or a signal which controls dimming is generated by appropriately combining data "0" and data "1". The CPU 45 can control the main circuit driving circuit 44 by an infrared remote control signal to fully turn on, dim, or turn off the fluorescent lamp 8.

As described above, a signal obtained upon receiving light by the light-receiving portion 12 is converted into a digital signal, and frequencies other than the carrier frequency ±1 kHz are greatly attenuated by the digital filter 23. Even if the argon spectrum near the wavelength of the infrared remote control signal is received, the influence of variations in argon spectral intensity over time can be reduced. Accordingly, the infrared remote control signal can be reliably extracted.

A signal having passed through the digital filter 23 is Hilbert-transformed by the Hilbert transformer 24, the peak is detected by the peak detector 25, and then the waveform is shaped by the waveform shaping circuit 26. A pulse signal contained in an infrared remote control signal can be extracted. When a code signal of "1" and "0" is formed by a combination of pulse signals, the code signal transmitted on an infrared remote control signal from the transmitter 3 can be reliably extracted.

Figure 8:
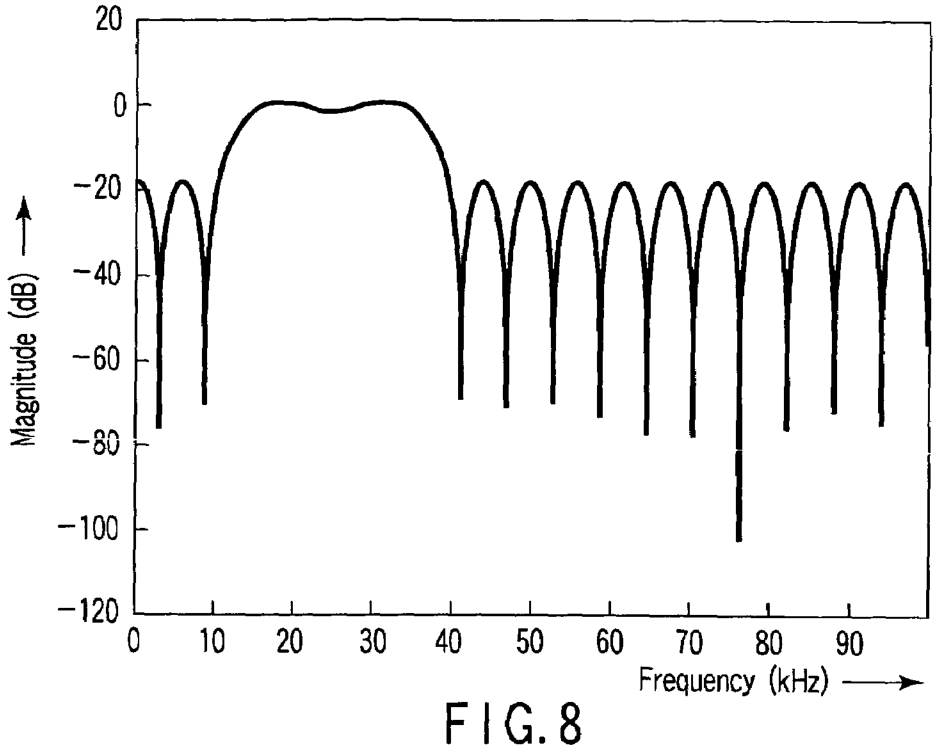
FIG. 8 is a graph showing the function of another digital filter used in the first embodiment.

The first embodiment adopts, as the digital filter 23, a band-pass filter which is formed by an FIR filter having a pass band of carrier frequency fc±1 kHz, a cutoff level of −20 dB or less, and an order of 173, but is not limited to this. For example, the digital filter 23 can be formed by an FIR filter having an upper cutoff frequency of 40 kHz, a lower cutoff frequency of 10 kHz, a cutoff level of −20 dB or less, and an order of 35. FIG. 8 shows the function of this filter.

The pass band containing a carrier wave widens when such filter is used, but the filter can be implemented with a smaller order. The use of a smaller-order filter can shorten the calculation time of the CPU 45 and the response time. Also, the burden on the CPU 45 can be reduced.

SECOND EMBODIMENT

The same reference numerals as in the above-described embodiment denote the same parts, and a detailed description thereof will be omitted. The second embodiment will describe the circuit arrangement of a discharge lamp lighting apparatus including a receiver.

Figure 9:
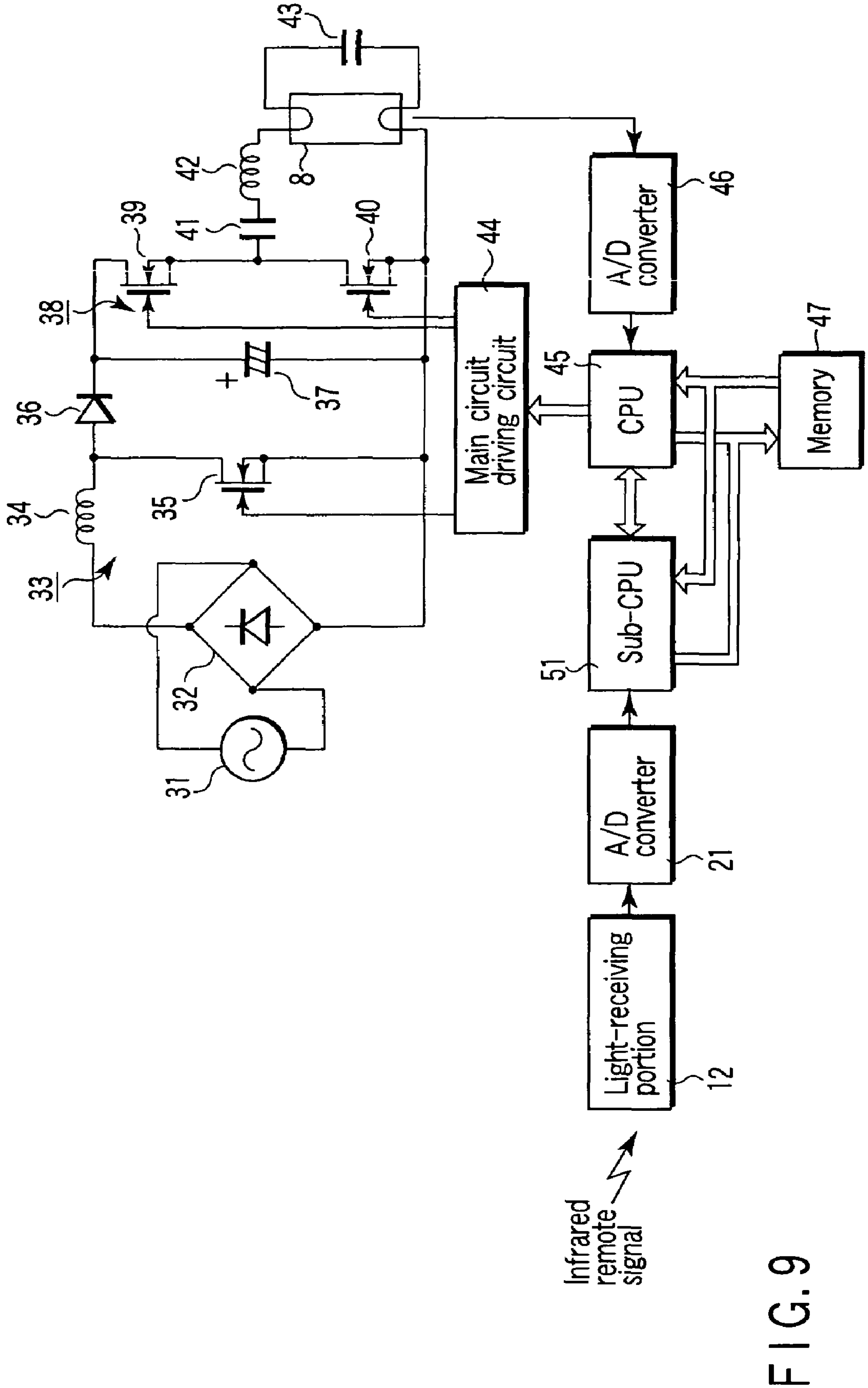
FIG. 9 is a diagram showing the circuit arrangement of a discharge lamp lighting apparatus including a receiver according to the second embodiment of the present invention.

In this apparatus, as shown in FIG. 9, a sub-CPU 51 replaces the signal processor 22. Since a digital filter 23, Hilbert transformer 24, peak detector 25, and waveform shaping circuit 26 in the signal processor 22 can be implemented by program processes, necessary data are stored in a memory 47. While the sub-CPU 51 reads out necessary data from the memory 47, a digital filter process, Hilbert transformation process, peak detection process, and waveform shaping process are sequentially performed to supply the final result to the CPU 45.

Even if the signal processor 22 is formed by software, the same operation effects as those of the first embodiment can be obtained.

THIRD EMBODIMENT

The same reference numerals as in the above-described embodiments denote the same parts, and a detailed description thereof will be omitted. The third embodiment will also describe the circuit arrangement of a discharge lamp lighting apparatus including a receiver.

Figure 10:
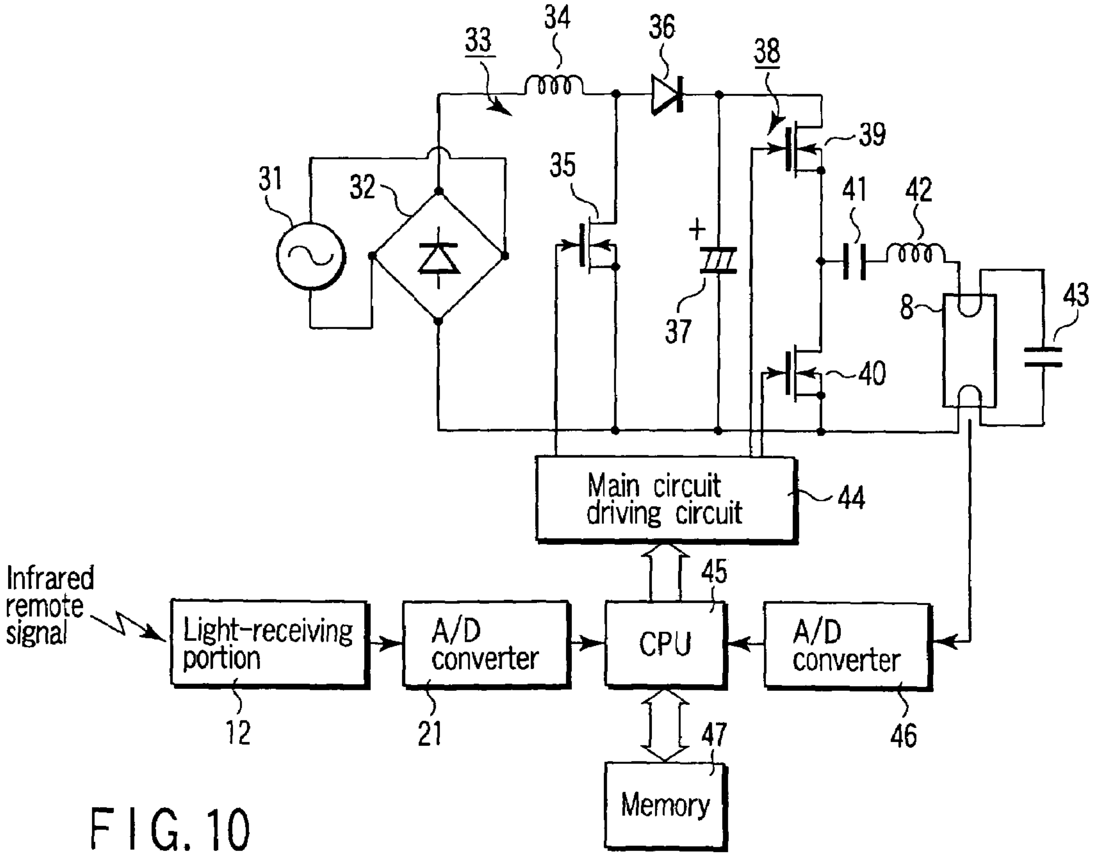
FIG. 10 is a diagram showing the circuit including a receiver according to the third embodiment of the present invention.

In this apparatus, as shown in FIG. 10, all the functions of a signal processor 22 are installed into a CPU 451, and implemented by program processes of the CPU 451. In addition to control of a main circuit driving circuit 44, the CPU 451 sequentially performs a digital filter process, Hilbert transformation process, peak detection process, and waveform shaping process while reading out necessary data from a memory 47.

Since the CPU 451 also functions as a signal processor, the same operation effects as those of the first embodiment can be obtained.

Figure 11:
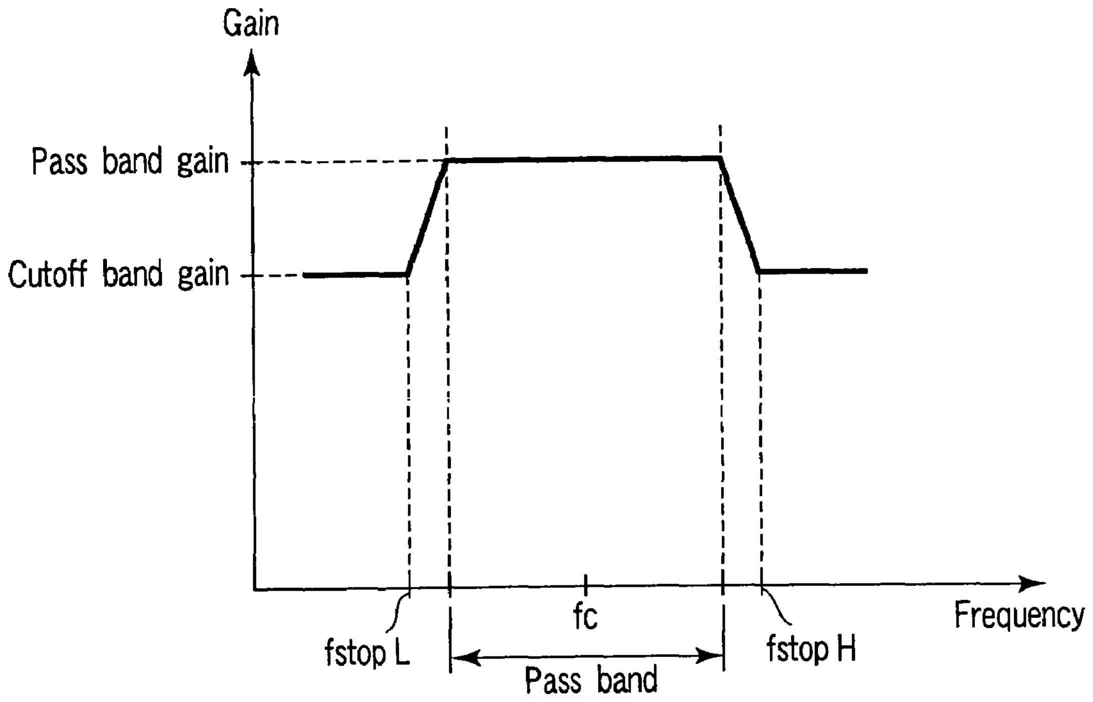
FIG. 11 is a graph showing an example of the relationship between a carrier frequency fc, the pass band, and upper and lower cutoff frequencies fstopH and fstopL.

Embodiments pertaining to settings of the carrier frequency fc, the pass band, upper and lower cutoff frequencies fstopH and fstopL, and the sampling frequency fs in the digital filter process will be described. FIG. 11 shows an example of the relationship between the carrier frequency fc, the pass band, and the upper and lower cutoff frequencies fstopH and fstopL.

The circuit arrangement of a discharge lamp lighting apparatus including a receiver can comply with any one of the above-described embodiments.

FOURTH EMBODIMENT

When the carrier frequency of an infrared remote control signal is fc, the pass band of a digital filter is set to fc±f1, the upper cutoff frequency is set to fstopH (>fc+f1), the lower cutoff frequency is set to fstopL (<fc−f1), and the sampling frequency fs is set to fs >2·fstopH. With these settings, a signal can be completely reconstructed for a fundamental component on the basis of the sampling theorem.

As for the gain setting of the digital filter, the gain at fstopL is set equal to or lower than 1/10 of the gain at fc−f1, and the gain at fstopH is set equal to or lower than 1/10 of the gain at fc+f1. With these gain settings, a digital filter capable of reliably extracting a necessary signal can be constructed.

Figure 12:
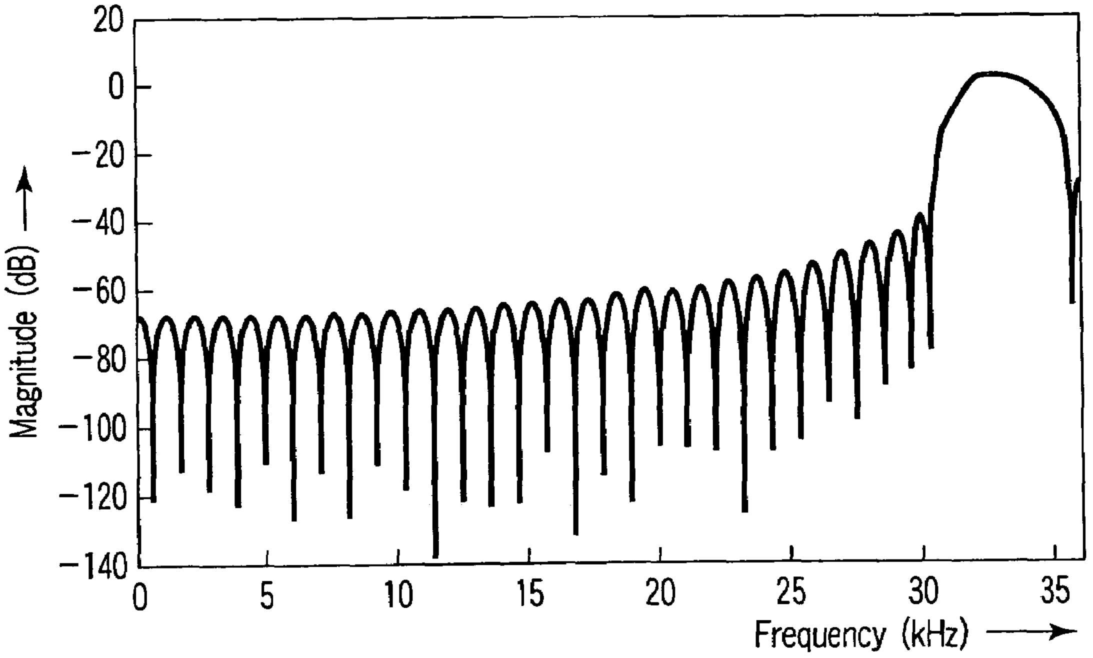
FIG. 12 is a waveform chart showing the gain function of a digital filter according to the fourth embodiment of the present invention.
Figure 13:
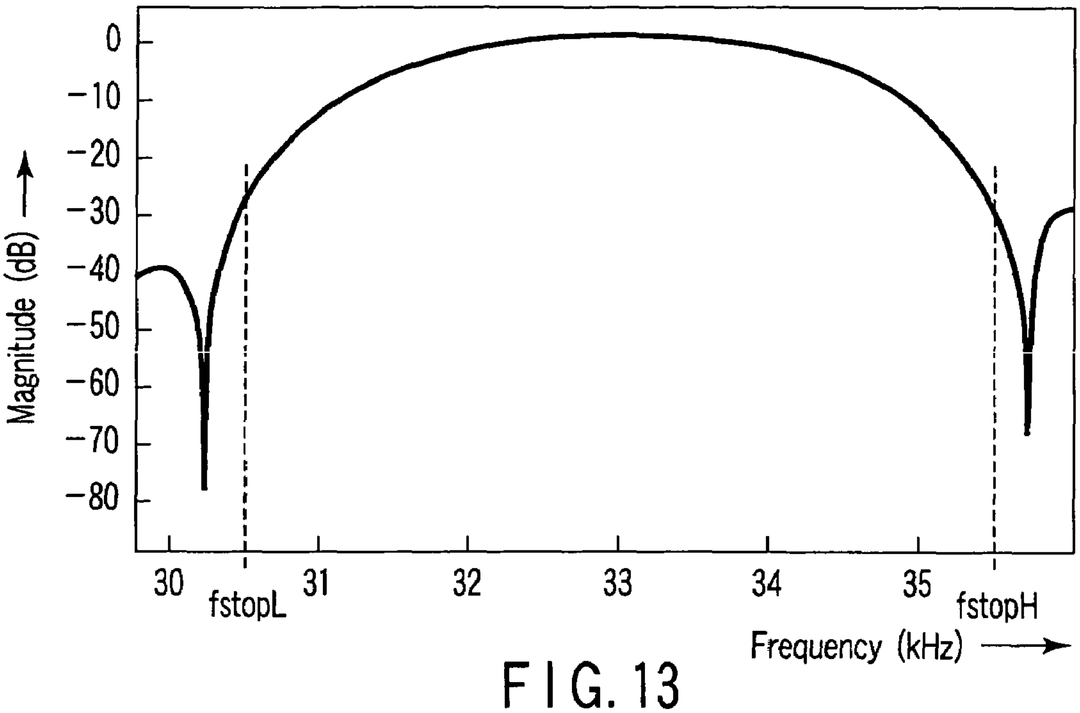
FIG. 13 is an enlarged waveform chart of the main part in FIG. 12.

For example, when the sampling frequency fs is set to 72 kHz at fc=33 kHz, f1=1 kHz, fstopL=30.5 kHz, and fstopH=35.5 kHz, fs exceeds twice the upper cutoff frequency fstopH. At this time, the gain function of the digital filter can be set to one as shown in FIGS. 12 and 13. FIG. 13 is an enlarged waveform chart of the main frequency range in FIG. 12.

The gain must be so set as to transmit a frequency in the pass band without any attenuation and sufficiently attenuate a frequency in the cutoff band, compared to the pass band. For example, the cutoff band is set to about 1/10 of the pass band, i.e., −20 dB or less. In FIG. 13, an attenuation factor of about −30 dB is set at fstopL and fstopH.

By using this digital filter, even if the light-receiving portion receives light such as the argon spectrum, a signal associated with variations in argon spectral intensity is greatly attenuated by the digital filter process to transmit a frequency in the pass band fc±f1. Setting the sampling frequency fs to 72 kHz can reduce the burden on the CPU in a signal process. This embodiment is suitable for a case wherein one CPU 451 shown in FIG. 10 executes an infrared signal process.

FIFTH EMBODIMENT

One module time in the format of data superposed on an infrared remote control signal is T1, data "0" is expressed by high-level period T1+low-level period T1, and data "1" is expressed by high-level period T1+low-level period 3×T1. In this case, when the carrier frequency of the infrared remote control signal is fc, the pass band of the digital filter is set to fc±1/(2·T1), the upper cutoff frequency is set to fstopH (>fc+1/(2·T1)), the lower cutoff frequency is set to fstopL (<fc−1/(2·T1)), and the sampling frequency fs is set to fs >2·fstopH.

That is, when the amplitude of the carrier frequency fc is modulated using a transmission data signal, the infrared remote control signal contains frequency components such as fc±1/(2·T1) and fc±1/(4·T1) in addition to fc. To extract a signal component from an infrared remote control signal, frequency components such as fc±1/(2·T1) and fc±1/(4·T1) are required in addition to the carrier frequency fc. To extract such carrier frequency, the frequency must be transmitted in the range fc±1/(2·T1).

By setting the pass band of the digital filter in this way, a signal can be completely reconstructed for the fundamental component of a carrier signal modulated by a maximum modulated component ½ T1.

Figure 14:
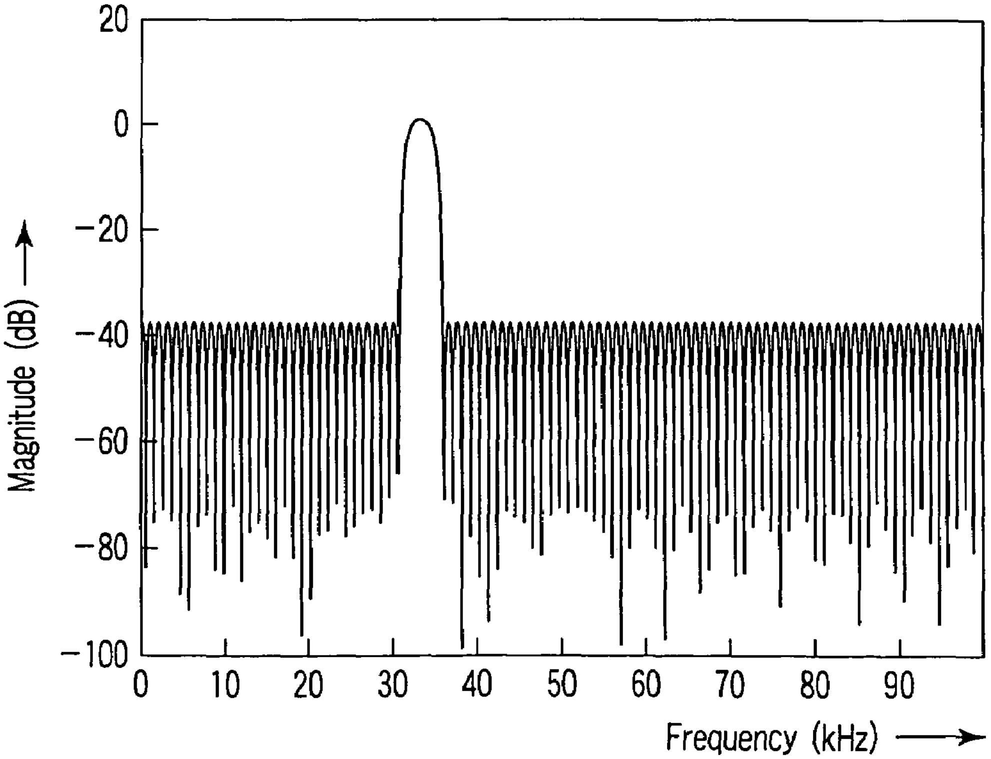
FIG. 14 is a waveform chart showing a gain function in an example of a digital filter according to the fifth embodiment of the present invention.
Figure 15:
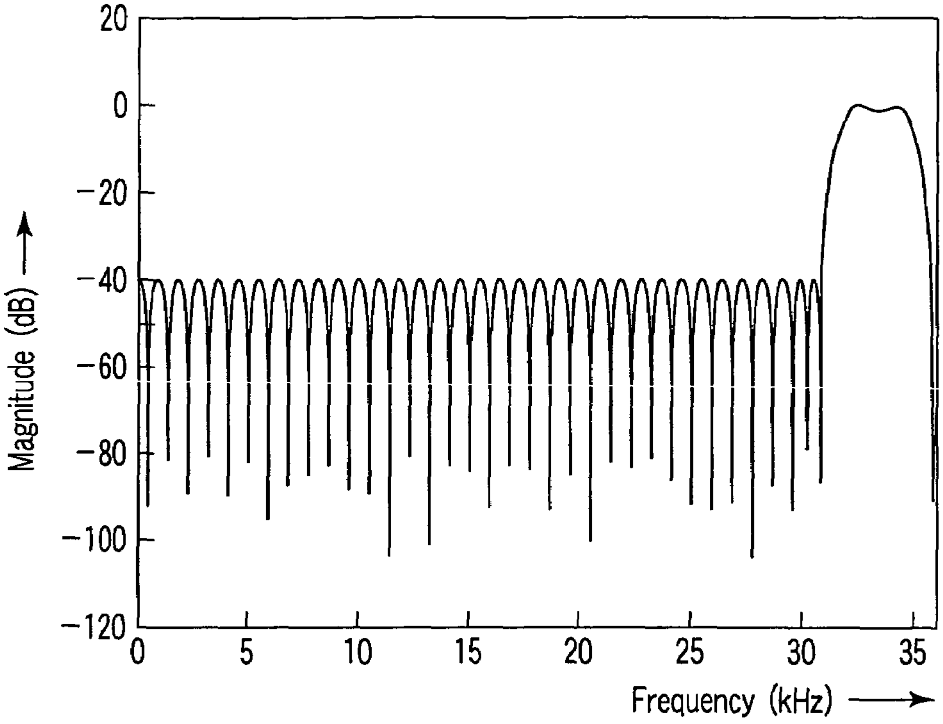
FIG. 15 is a waveform chart showing a gain function in another example of the digital filter according to the fifth embodiment.

For example, when the cutoff band is set to an attenuation factor of about −40 dB with respect to the pass band and the sampling frequency fs is set to 200 kHz at fc=33.3 kHz, T1=0.64 msec, fstopL=30.5 kHz, and fstopH=35.5 kHz, the digital filter exhibits a gain function as shown in FIG. 14. At the sampling frequency fs of 72 kHz, the digital filter attains a gain function as shown in FIG. 15.

By using this digital filter, even if the light-receiving portion receives light such as the argon spectrum, a signal associated with variations in argon spectral intensity is greatly attenuated by the digital filter process to transmit a frequency in the pass band fc±1/(2·T1). Setting the sampling frequency fs to 72 kHz can reduce the burden on the CPU in a signal process. This embodiment is suitable for a case wherein one CPU 451 shown in FIG. 10 executes an infrared signal process.

SIXTH EMBODIMENT

In the sixth embodiment, the minimum value of the lighting frequency of a fluorescent lamp 8 is set higher than the upper cutoff frequency fstopH of a digital filter in a discharge lamp lighting apparatus having the circuit arrangement in FIG. 5, 9, or 10.

Figure 22:
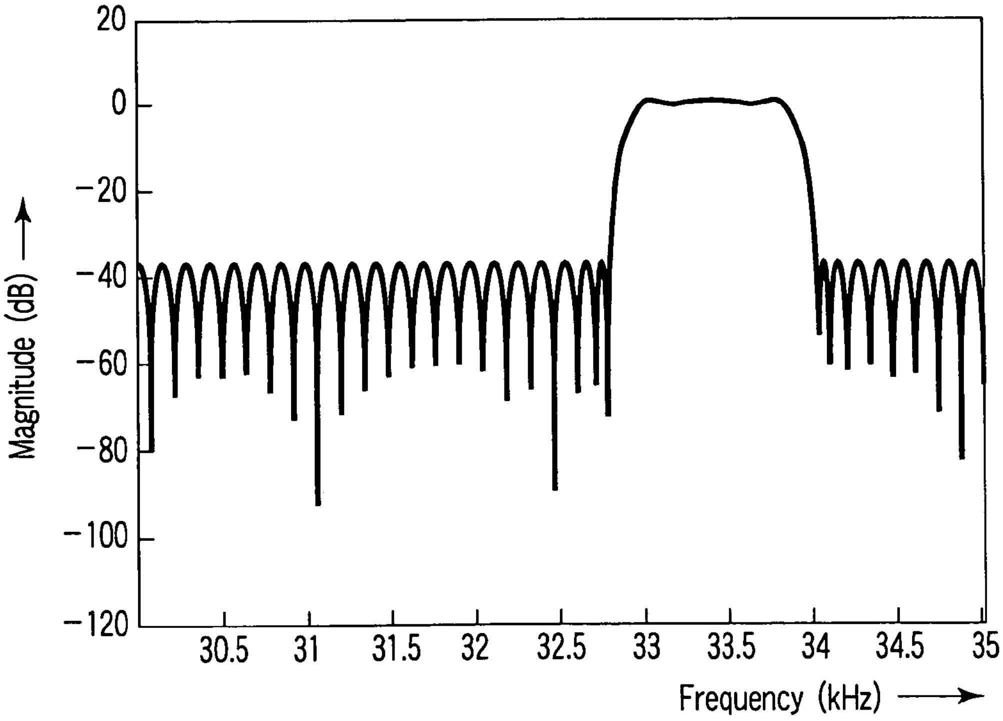
FIG. 22 is an enlarged waveform chart of the main part in FIG. 21.

A discharge lamp, particularly, a fluorescent lamp having a tube diameter of 25.5 mm or less is known to emit an argon spectrum in the initial lighting stage at a low temperature. The argon spectrum intensity repetitively increases/decreases in synchronism with the lighting cycle of the lamp, as shown in FIG. 22. The argon spectrum intensity in the infrared range also similarly varies. If the argon spectrum is received by a light-receiving portion 12 and then passes through the digital filter, the signal may be erroneously determined as a remote control signal though no remote control signal has been received.

To avoid this, the minimum value of the lighting frequency of the fluorescent lamp 8 is set higher than the upper cutoff frequency fstopH of the digital filter. Since variations in argon spectrum intensity over time synchronize with the lighting frequency of the fluorescent lamp 8, they exceed the upper cutoff frequency fstopH of the digital filter. These variations are greatly attenuated by the digital filter, thus the argon spectrum hardly passes through the filter. Even this setting can transmit only a component around a carrier signal.

Figure 16:
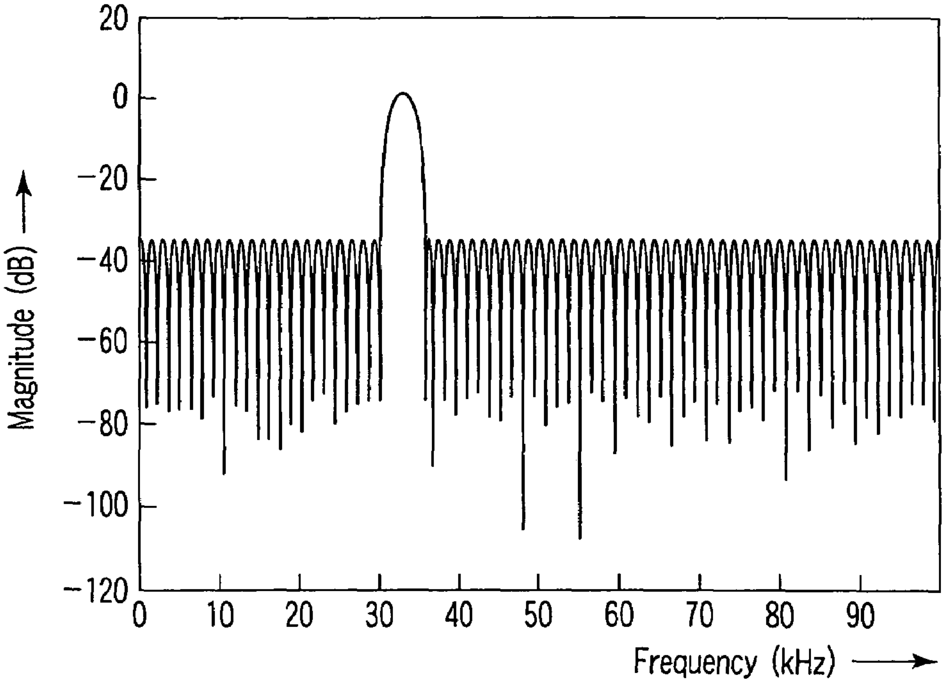
FIG. 16 is a waveform chart showing the gain function of a digital filter according to the sixth embodiment of the present invention.

For example, the digital filter has a gain function as shown in FIG. 16 at fc=33 kHz, the pass band f±1 kHz, the lower cutoff frequency fstopL=30 kHz, the upper cutoff frequency fstopH=36 kHz, and the sampling frequency fs=200 kHz. In this case, the minimum value of the lighting frequency of the fluorescent lamp is set higher than 36 kHz. Considering radiation noise from the lamp, the lighting frequency is desirably set to 150 kHz or less.

In the sixth embodiment, the argon spectrum intensity is attenuated by setting the minimum value of the lighting frequency of the fluorescent lamp higher than the upper cutoff frequency fstopH. To the contrary, the argon spectrum intensity can also be attenuated by setting the lighting frequency of the fluorescent lamp lower than the lower cutoff frequency fstopL. Note that the lighting frequency based on the lower cutoff frequency fstopL must be set higher than 20 kHz because noise is generated at a frequency equal to or lower than 20 kHz, which is the upper limit of the audio frequency.

SEVENTH EMBODIMENT

In the seventh embodiment, the upper cutoff frequency fstopH of a digital filter is set lower than the minimum value of the lighting frequency of a fluorescent lamp 8 in a discharge lamp lighting apparatus having the circuit arrangement in FIG. 5, 9, or 10. When one module time in the format of data superposed on an infrared remote control signal is T1 and the carrier frequency of an infrared remote control signal is fc, the pass band of the digital filter is set to fc±1/(2·T1).

In this manner, the upper cutoff frequency fstopH of the digital filter is set lower than the minimum value of the lighting frequency of the fluorescent lamp 8. Since variations in argon spectrum intensity over time synchronize with the lighting frequency of the fluorescent lamp 8, they exceed the upper cutoff frequency fstopH of the digital filter. The argon spectrum is greatly attenuated by the digital filter and hardly passes through the filter. Even this setting can transmit only a frequency in the pass band fc±1/(2·T1).

Figure 17:
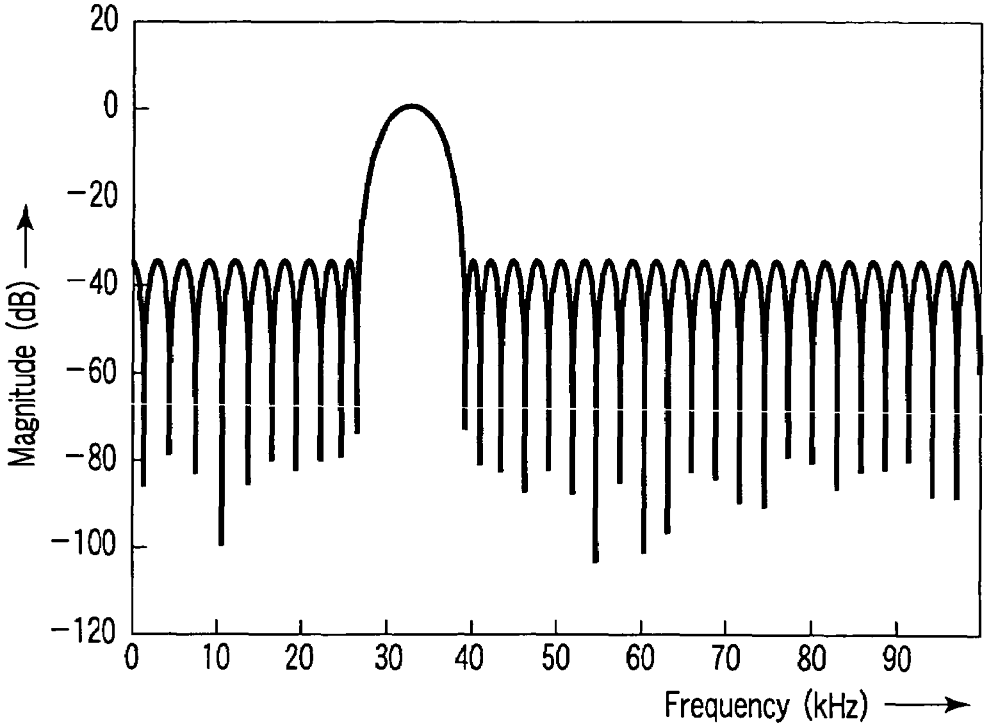
FIG. 17 is a waveform chart showing a gain function in an example of a digital filter according to the seventh embodiment of the present invention.

For example, when the minimum value of the lighting frequency of the fluorescent lamp 8 is 40 kHz, the carrier frequency fc of an infrared remote control signal is 33 kHz, the pass band of the digital filter is fc±2 kHz, the lower cutoff frequency fstopL is 27 kHz, the upper cutoff frequency fstopH is 39 kHz, and the sampling frequency fs is 200 kHz, the digital filter has a gain function as shown in FIG. 17. In this case, the filter order is 71.

As described above, only a carrier signal can be transmitted by setting the upper cutoff frequency fstopH to 39 kHz when the minimum value of the lighting frequency of the fluorescent lamp 8 is 40 kHz.

Figure 18:
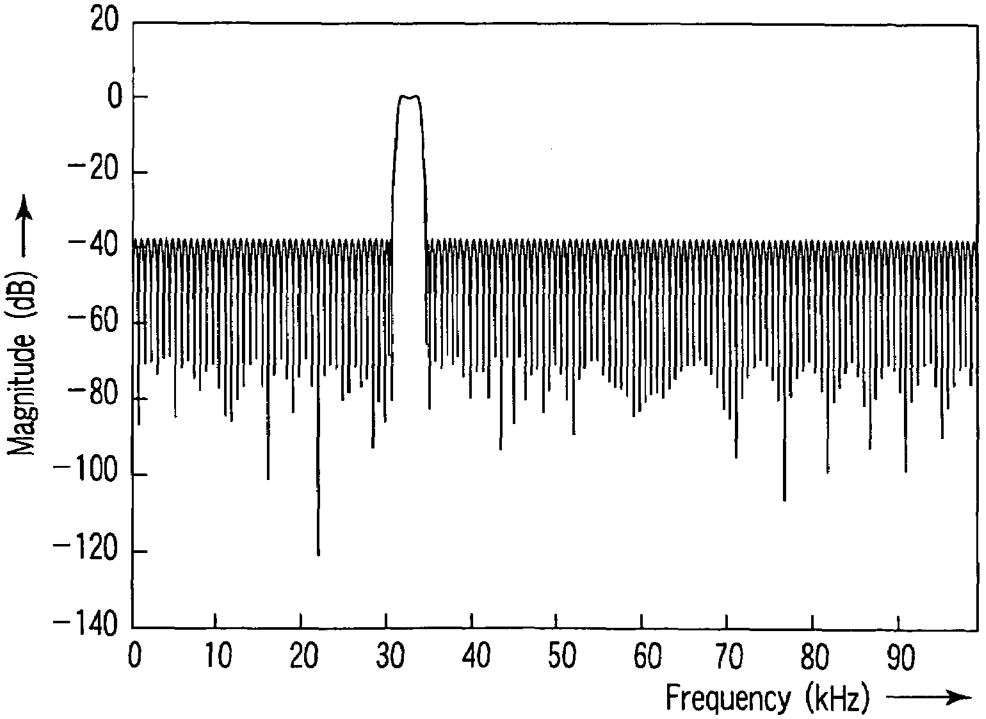
FIG. 18 is a waveform chart showing a gain function in another example of the digital filter according to the seventh embodiment.

If the minimum value of the lighting frequency of the fluorescent lamp 8 is 40 kHz, the carrier frequency pass band of the digital filter is fc±1 kHz, the lower cutoff frequency fstopL is 31 kHz, the upper cutoff frequency fstopH is 35 kHz, and the sampling frequency fs is 200 kHz, the digital filter has a gain function as shown in FIG. 18. In this case, the filter order is 284.

Only a carrier signal can be transmitted even by setting the upper cutoff frequency fstopH to 35 kHz when the minimum value of the lighting frequency of the fluorescent lamp 8 is 40 kHz.

In the case of FIG. 17, the filter order is small, and the calculation burden on the CPU can be reduced. This digital filter is suitable for one CPU shown in FIG. 10. In the case of FIG. 18, the filter order is large, and the calculation time becomes four times longer than that in the case of FIG. 17. Thus, the digital filter of FIG. 18 is suited when a sub-CPU 51 shown in FIG. 9 performs an infrared signal process.

EIGHTH EMBODIMENT

In the eighth embodiment, the pass band of a digital filter is set within the range of fc−1/(2·T1) to fc when one module time in the format of data superposed on an infrared remote control signal is T1 and the carrier frequency of an infrared remote control signal is fc in a discharge lamp lighting apparatus having the circuit arrangement in FIG. 5, 9, or 10. At this time, the lower cutoff frequency is set to fstopL (<fc−f1/(2·T1)), the upper cutoff frequency is set to fstopH (>fc), and the sampling frequency fs is set to fs >2·fstopH.

An infrared remote control signal often undergoes AM modulation or ASK modulation by a signal having the carrier frequency fc and one module time T1, and the maximum frequency of a modulated signal is 1/(2·T1). In order-to transmit the modulated signal and cut off other signals, it suffices if the pass band of the digital filter contains a side-band wave on one side.

Figure 19:
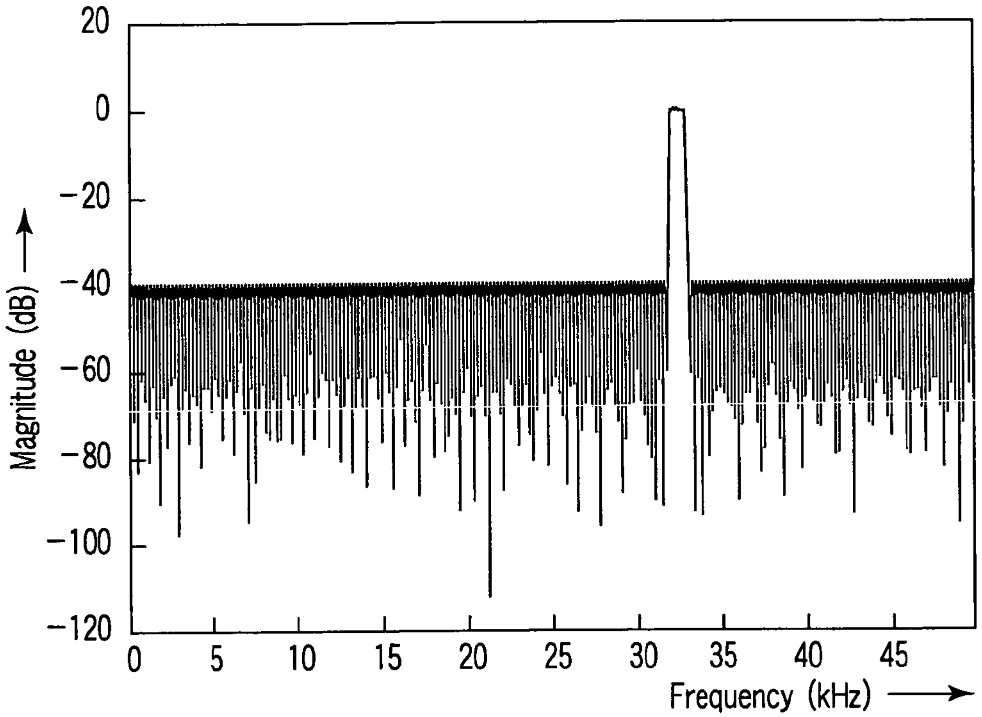
FIG. 19 is a waveform chart showing a gain function in an example of a digital filter according to the eighth embodiment of the present invention.
Figure 20:
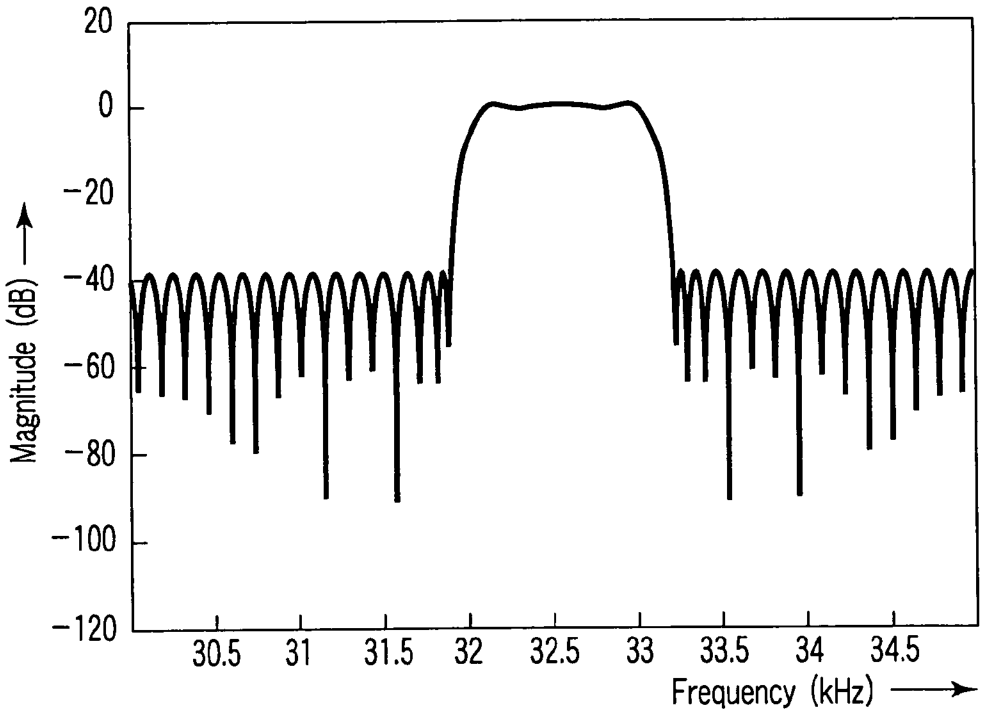
FIG. 20 is an enlarged waveform chart of the main part in FIG. 19.

At T1=0.64 msec, f1=1/(2·T1)=781.25 Hz. When the pass band of the digital filter is set within a range of fc−1/(2·T1) to fc at the carrier frequency fc=33 kHz and the sampling frequency fs=100 kHz, the filter has a gain function as shown in FIGS. 19 and 20. FIG. 20 is an enlarged waveform chart of the main frequency range in FIG. 19.

Hence, variations in argon spectral intensity over time can be reduced even by setting the bandwidth of the digital filter to a minimum width of fc−1/(2·T1) to fc, thereby extracting only an infrared remote control signal component. The bandwidth can be set to a position greatly deviated from the lighting frequency of the fluorescent lamp, and variations in argon spectral intensity over time can be further reduced.

If one module time in the format of data T1 and the carrier frequency of an infrared remote control signal is fc, the pass band of the digital filter is set within the range of fc to fc+1/(2·T1). At this time, the lower cutoff frequency is set to fstopL (<fc), the upper cutoff frequency is set to fstopH (>fc+1/(2·T1)) and the sampling frequency fs is set to fs >2·fstopH.

Figure 21:
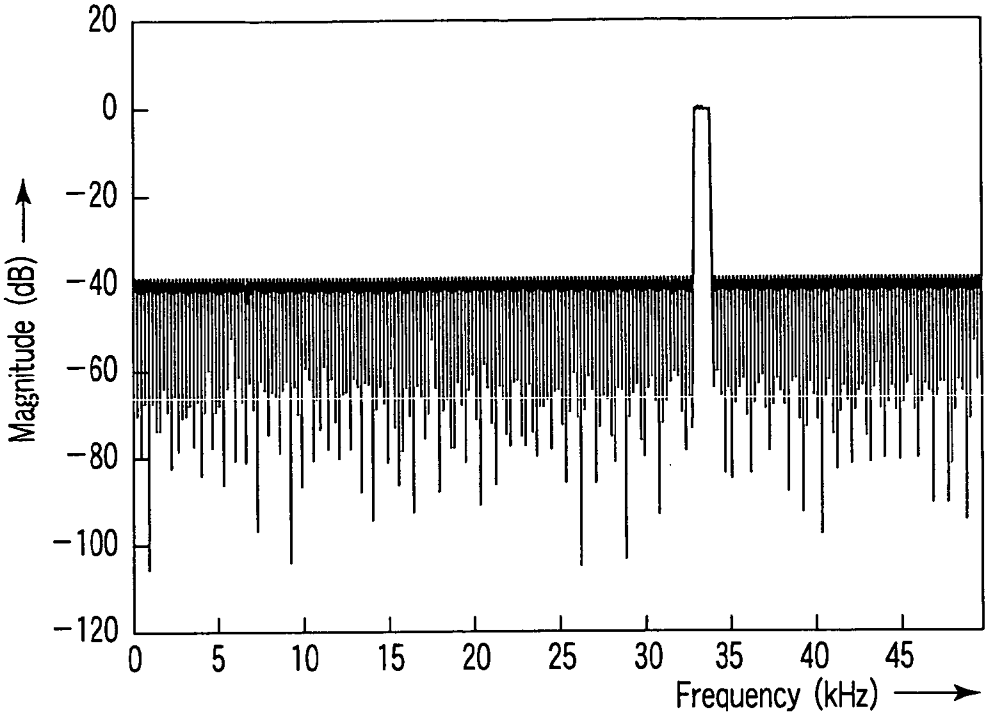
FIG. 21 is a waveform chart showing a gain function in another example of the digital filter according to the eighth embodiment.

As described above, f1=1/(2·T1)=781.25 Hz at T1=0.64 msec. When the pass band of the digital filter is set within the range of fc to fc+1/(2·T1) at the carrier frequency fc=33 kHz and the sampling frequency fs=100 kHz, the filter has a gain function as shown in FIGS. 21 and 22. FIG. 22 is an enlarged waveform chart of the main frequency range in FIG. 21.

Variations in argon spectral intensity over time can be reduced even by setting the bandwidth of the digital filter to a minimum width of fc to fc+1/(2·T1), extracting only an infrared remote control signal component.

Since only an infrared remote control signal component can be extracted using the digital filter, the lighting circuit can steadily operate.

In the above embodiments, the present invention is applied to an illumination apparatus. However, the present invention is not limited to this, and can be applied to another electronic apparatus such as an air conditioner except for the illumination apparatus.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A discharge lamp lighting apparatus comprising:

a light-receiving portion which receives an infrared remote control signal transmitted using a carrier wave having a carrier wave frequency fc;

an A/D converter which converts the infrared remote control signal received by the light-receiving portion into a digital signal by sampling at a frequency fs much higher than the carrier wave frequency fc of the infrared remote control signal;

a digital filter having a function of receiving the digital signal output from the A/D converter and of transmitting a component of the carrier wave frequency fc;

signal processing means for shaping a waveform of the component signal output from the digital filter; and a lighting control circuit which controls a discharge lamp having a tube diameter of not more than 25.5 mm in accordance with data from the signal processing means, on the condition that a minimum value of a discharge lamp lighting frequency is higher than an upper cutoff frequency of the digital filter.

2. An apparatus according to claim 1, wherein the digital filter sets a pass band within a range of fc ±1(2·T1), when one module time is T1 in creating a data format of the infrared remote control signal.

3. An apparatus according to claim 1, wherein:

the digital filter has a function of receiving the digital signal output of the A/D converter, and of transmitting a frequency component within a range of fc-1/(2·T1) to fc, when one module time is T1 in creating a data format of the infrared remote control signal.

4. An apparatus according to claim 3, wherein the A/D converter sets the sampling frequency fs to fs>2·fstopH, when an upper cutoff frequency of the digital filter is set to filter>fc.

5. An apparatus according to claim 1, wherein the digital filter has a function of receiving the digital signal output from the A/D converter, and of transmitting a frequency component within a range of fc to fc+1/(2·T1), when one module time is T1 in creating a data format of the infrared remote control signal.

6. An apparatus according to claim 5, wherein the A/D converter sets the sampling frequency fs to fs>2·fstopH, when an upper cutoff frequency of the digital filter is set to filter>fc+1(2·T1).

7. A discharge lamp lighting apparatus comprising:

a light-receiving portion which receives an infrared remote control signal transmitted using a carrier wave;

an A/D converter which converts the infrared remote control signal received by the light-receiving portion into a digital signal by sampling at a frequency fs much higher than the carrier wave frequency fc of the infrared remote control signal;

a digital filter having a function of receiving the digital signal output from the A/D converter and of transmitting a component of the carrier wave frequency fc;

signal processing means for shaping a waveform of the component signal output from the digital filter; and a lighting control circuit which controls a discharge lamp having a tube diameter of not more than 25.5 mm in accordance with the data from the signal processing means, on the condition that a discharge lamp lighting frequency is lower than a lower cutoff frequency of the digital filter and higher than 20 kHz.

* * * * *